United States Patent
Rojas et al.

(10) Patent No.: US 11,836,594 B2
(45) Date of Patent: Dec. 5, 2023

(54) CREATION OF DETAILED PERCEPTUAL DESCRIPTION RATINGS FROM GENERAL PERCEPTION RATINGS

(71) Applicant: International Business Machines Corporation, Armonk, NY (US)

(72) Inventors: Pablo Meyer Rojas, Brooklyn, NY (US); Elkin Dario Gutierrez, Jersey City, NJ (US); Guillermo Cecchi, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 16/412,766

(22) Filed: May 15, 2019

(65) Prior Publication Data

US 2020/0364536 A1    Nov. 19, 2020

(51) Int. Cl.
*G06N 3/04* (2023.01)
*G06F 40/30* (2020.01)

(52) U.S. Cl.
CPC ............... *G06N 3/04* (2013.01); *G06F 40/30* (2020.01)

(58) Field of Classification Search
CPC ........................................................ G06N 3/04
See application file for complete search history.

(56) References Cited

U.S. PATENT DOCUMENTS

| | | | |
|---|---|---|---|
| 5,200,817 A * | 4/1993 | Birnbaum | H04N 1/603 358/505 |
| 7,167,815 B2 | 1/2007 | Labreche et al. | |
| 9,336,192 B1 * | 5/2016 | Barba | G06F 40/30 |
| 9,959,392 B2 | 5/2018 | Sobel et al. | |
| 10,223,353 B1 * | 3/2019 | Labarre | G06F 40/253 |
| 2004/0122657 A1 | 6/2004 | Brants et al. | |
| 2010/0110455 A1 | 5/2010 | Woolfe | |
| 2017/0337573 A1 * | 11/2017 | Toprak | G07C 5/006 |
| 2017/0364605 A1 | 12/2017 | Sobel et al. | |
| 2018/0120277 A1 | 5/2018 | Chang et al. | |
| 2019/0171673 A1 * | 6/2019 | Sobel | A61B 5/4011 |
| 2019/0338226 A1 * | 11/2019 | Agos n Trumper | C12F 3/04 |

OTHER PUBLICATIONS

Martinez-Mayorga et al. Chapter 3 Chemoinformatics Analysis and Structural Similarity Studies of Food-Related Databases. Foodinformatics. 2014. (Year: 2014).*

(Continued)

*Primary Examiner* — Alexey Shmatov
*Assistant Examiner* — Robert Bejcek, II
(74) *Attorney, Agent, or Firm* — CANTOR COLBURN LLP; Kristofer Haggerty

(57) ABSTRACT

Embodiments of the invention include computer-implemented methods, computer systems, and computer program products for predicting sensory perception. A non-limiting example of the computer-implemented method includes receiving at a processor a library including a plurality of indexed sensory descriptors. A sensory target descriptor is also received at the processor. The processor is configured to calculate a coefficient matrix based in part on the semantic distance between an indexed sensory descriptor and a sensory target descriptor. The processor is further configured to generate a perceptual descriptor prediction for the sensory target.

16 Claims, 8 Drawing Sheets

(56) References Cited

OTHER PUBLICATIONS

Lassoued et al. Baked product texture: Correlations between instrumental and sensory characterization using Flash Profile. Journal of Cereal Science 48 (2008) 133-143 (Year: 2008).*
Castro et al.; "Categorical Dimensions of Human Odor Descriptor Space Revealed by Non-Negative Matrix Factorization"; PLOS ONE, vol. 8, Iss. 9; Sep. 2013; 16 pages.
Gutierrez et al.; "Predicting natural language descriptions of monomolecular odorants"; Nature Communications (2018) <www.nature.com/naturecommunications>; 12 pages.
Gutierrez et al.; "Predicting natural language descriptions of smells"; <http://dx.doi.org/10.1101/331470>; May 25, 2018; 36 pages.
Keller et al.; "Predicting human olfactory perception from chemical features of odor molecules"; Science 355 <http://science.sciencemag.org>, Feb. 24, 2017; 8 pages.
Kiela et al.; "Grounding Semantics in Olfactory Perception"; Proceedings of the 53rd Annual Meeting of the Association for Computational Linguistics; Beijing, China, Jul. 26-31, 2015; 6 pages.
Li et al.; "Accurate prediction of personalized olfactory perception from large-scale chemoinformatic features"; Oxford University Press; Dec. 15, 2017; 11 pages.
Mell et al.; "The NIST Definition of Cloud Computing—Recommendations of the National Institute of Standards and Technology"; U.S. Department of Commerce; Sep. 2011; 7 pages.

* cited by examiner

CREATION OF DETAILED PERCEPTUAL DESCRIPTION RATINGS FROM GENERAL PERCEPTION RATINGS

BACKGROUND

The present invention generally relates to computing systems, and more specifically, to the use of computing systems to create detailed perceptual description ratings from general perception ratings.

Speech analysis and characterization of the various senses (olfaction, taste, touch, hearing, and vision) can be conveyed in words, sentences, paragraphs, facial expressions, and even books. Recent studies have suggested that humans have a relatively high capability of discriminating between various sensory inputs. On the other hand, the ability to recognize or characterize sensory inputs by description can be relatively limited. For instance, in some cases only a handful of descriptors are available to distinguish between a larger set of distinguishable sensor inputs, such as taste, smell, and touch. Moreover chosen descriptors for sensory inputs can vary from person to person.

SUMMARY

Embodiments of the present invention are directed to a computer-implemented method for predicting sensory perception. A non-limiting example of the computer-implemented method includes receiving, by a processor, a library including a plurality of indexed sensory descriptors. The method also includes receiving, by the processor, a sensory target descriptor. The method also includes calculating, by the processor, a coefficient matrix based in part on the semantic distance between an indexed sensory descriptor and a sensory target descriptor. The method also includes generating a perceptual descriptor prediction for the sensory target.

Embodiments of the invention are directed to a computer program product for predicting sensory perception, the computer program product including a computer readable storage medium having program instructions embodied therewith. The program instructions are executable by a processor to cause the processor to perform a method. A non-limiting example of the method includes receiving, by a processor, a library including a plurality of indexed sensory descriptors. The method also includes receiving, by the processor, a sensory target descriptor. The method also includes calculating, by the processor, a coefficient matrix and a perceptual distance between an indexed sensory descriptor and a sensory target descriptor. The method also includes generating a perceptual descriptor prediction for the sensory target.

Embodiments of the present invention are directed to processing system for predicting sensory perception. The system includes a processor in communication with one or more types of memory, the processor configured to perform a method. A non-limiting example of the method includes receiving a library including a plurality of indexed sensory descriptors. The method also includes receiving a sensory target descriptor. The method also includes calculating a coefficient matrix and a perceptual distance between an indexed sensory descriptor and a sensory target descriptor. The method also includes generating a perceptual descriptor prediction for the sensory target.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
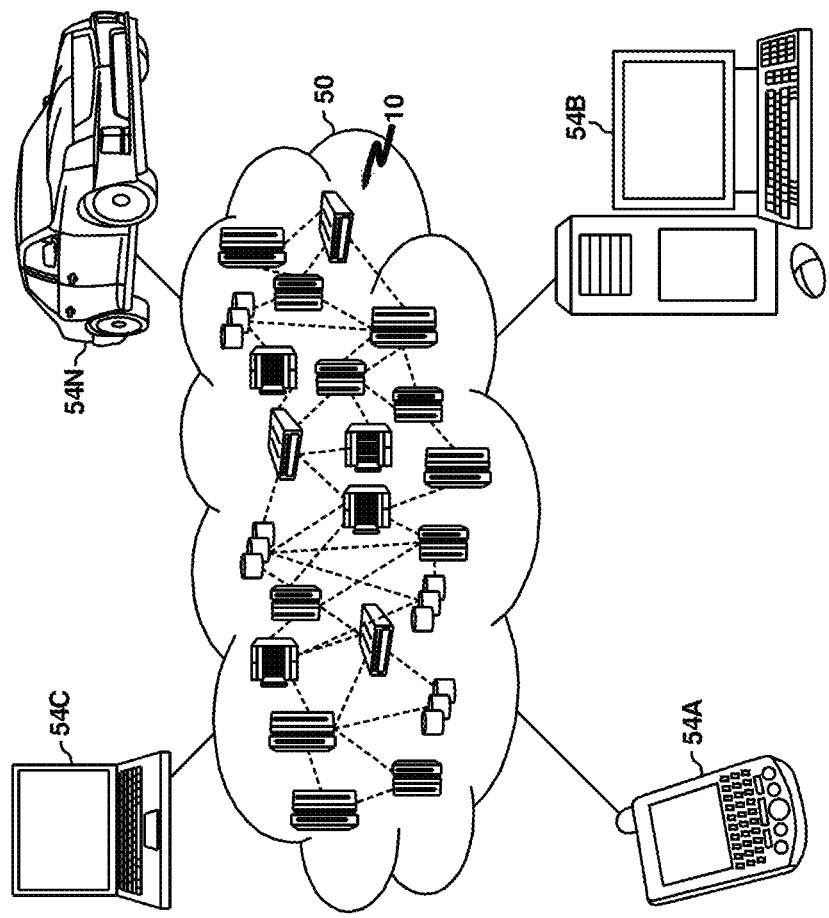
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
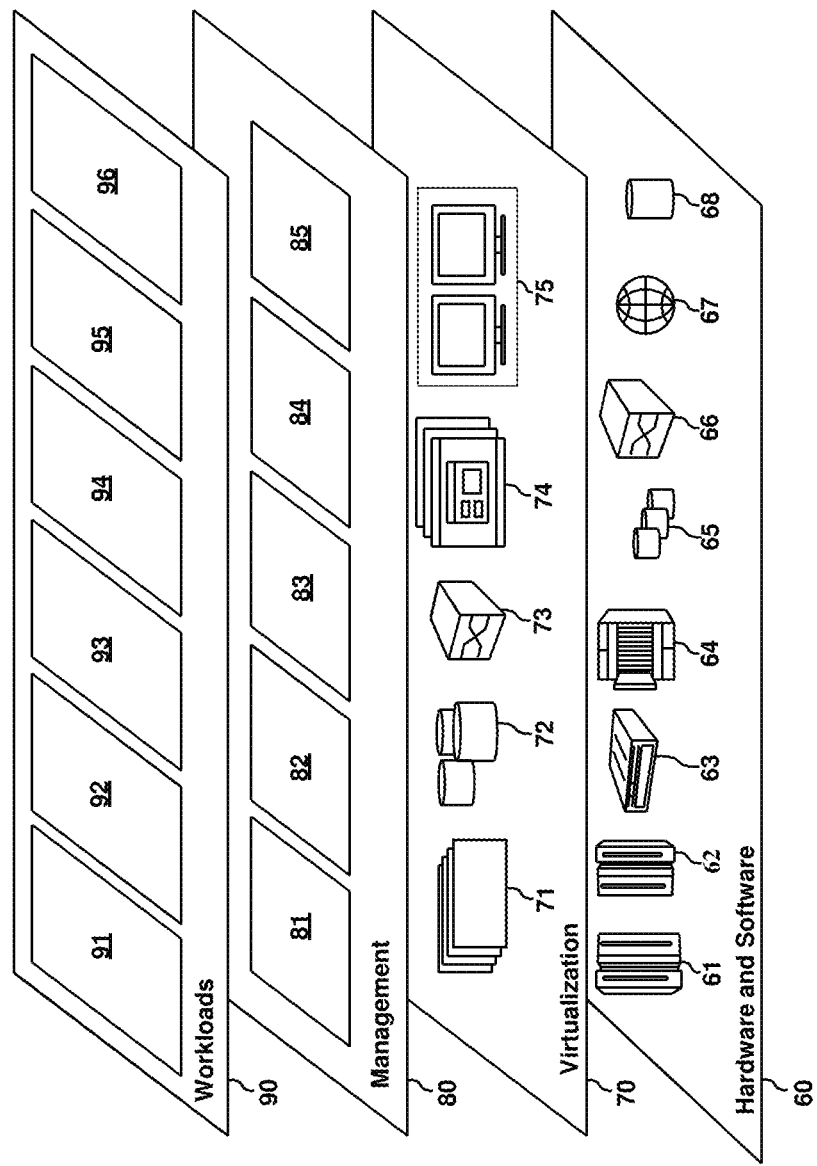
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; sensory processing 95; and descriptor processing 96.

Figure 3:
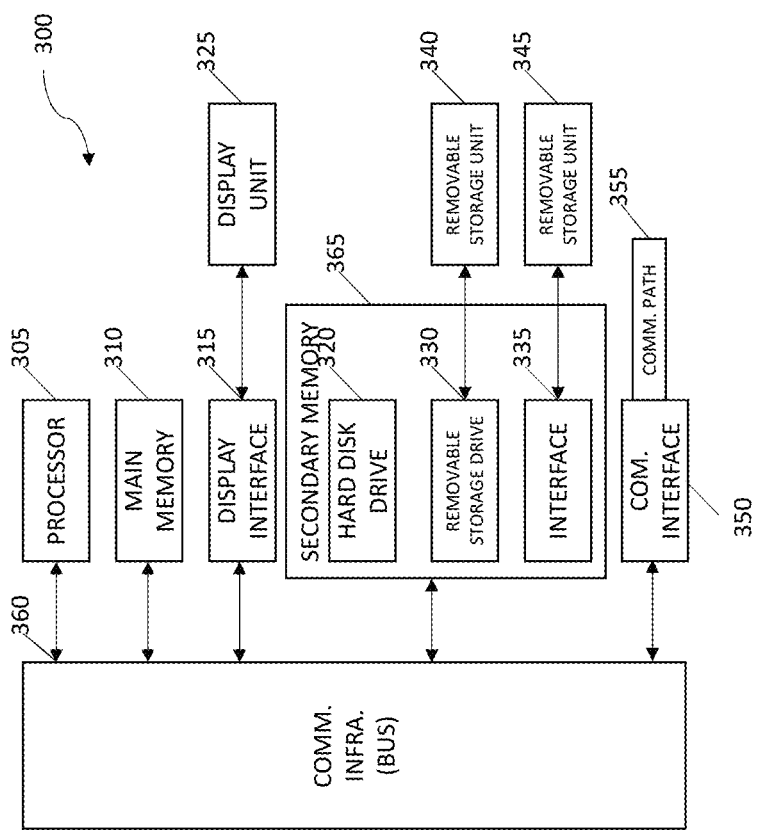
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, humans share with other species the ability to make subtle discriminative judgments of sensory information and act accordingly. For example, the olfactory pathway includes around 400 different receptors, thus allowing for a high dimensionality or complexity of sensory input. The taste pathway similarly contains four taste receptors that are combined with visual, olfactive, trigeminal, and mechanical inputs to contribute to the perception of taste.

Unique to humans, sensory-based judgments can be made with expressions of language. Cross-modal effects have been reported with respect to odor perception, for example. For instance, the primary olfactory cortex can be activated during passive reading of odor related words. For instance, an odor can be characterized as sweet, woody, sour, or spicy. However, although potentially trillions of mixtures can have distinct or identifiable odors, a similarly expansive universal system of characterizing or recognizing such odors by name does not exist. In addition, individualized expressions of olfactory signals can vary from person to person and can depend on a wide variety of factors, including the type of odor or taste, the complexity of the odor or taste, the language capacity of the individual communicating the olfactory perception, or even the context of the individual. For instance, a food connoisseur could be expected to recite a vastly different description of a particular dish, including identification for instance of tastes in a particular sample, than a casual food eater who could simply describe a sample as sweet or pleasant.

It is desirous to perform these tasks with computers because computers are uniquely able to take a complex word list, simplify it down to receive input from an average user, and then map those simplified word lists to a more complex word lists. In other words, people with a more limited vocabulary can use the computer to generate more specific, higher-vocabulary word lists to describe a sensory experience.

Prediction and characterization of sensory perception remains challenging in a computing environment. For instance, some conventional methods rely upon controlled rating systems of smell or taste tests, which can require the sampling of several individuals for characterization of a single smell or taste. In some cases, molecular structure information can be leveraged to predict certain sensory semantic descriptors. However, such methods can require the a priori characterization of a chemical feature of a substance and the resultant characterization can be limited to those characterizations provided in a controlled setting. Systems and methods to broadly characterize and predict sensory perception, without cumbersome testing, are needed.

Turning now to an overview of the aspects of the invention, one or more embodiments of the invention address the above-described shortcomings by providing a computing system configured and arranged to predict sensory perception characteristics of an object using semantic descriptors. In embodiments of the invention, the computing system provides expansive and detailed descriptions of sensory perceptions and leverages natural language descriptions to generalize or translate a description without the need for controlled testing. In embodiments of the invention, the computing system provides a predictive sensory perception profile of a substance or object based at least in part upon descriptors and sensory perception profiles of other substances or objects.

The above-described aspects of the invention address the shortcomings of the art by using a programmable computing system to generate a relationship between a perceptual descriptor of a sense (i.e., taste or smell) of a first sensory library or set of descriptors and a second set of descriptors including human language. Using this relationship, information along with perceptual ratings from other models, such as chemoinformatic models, one can generate a predictive semantic description of a larger dimension. In some embodiments of the invention, sense analysis using language (including words, sentences, paragraphs, and the like) and facial expressions are applied to systematize and quantify knowledge with respect to perceptual descriptions of taste and odors. In some embodiments of the invention, natural narrative descriptions of desired perceptual targets, also referred to herein as semantic descriptors, can be used to identify corresponding matching single molecules or mixtures through reverse engineering.

In some embodiments of the invention, semantic descriptors can complement or refine a sensory perception prediction for an object. For example, where a chemoinformatic model based solely upon molecular structure generates a rating prediction of specific olfactory semantic descriptors, speech analytics including, for instance, natural language processing (NLP) can expand the initial rating prediction to provide more detailed semantic descriptors, for instance expanding an initial rating for flower to infer and/or predict ratings for specific types of flowers, including rose, freesia, lily, daisy, and marigold. Some embodiments of the invention provide whole sentence descriptors of a sensory sensation to provide a ranked match of comparable or equivalent molecules or mixtures.

Embodiments of the invention can enable prediction and characterization of attributes of objects and substances based upon the input sense of other objects and substances without laboratory controlled settings.

Though the present methodology is intended to be used with a wide range of senses, most of the following discussion will be using olfactory sense in order to describe the method. The same methodology is applicable across the full range of senses.

Figure 4:
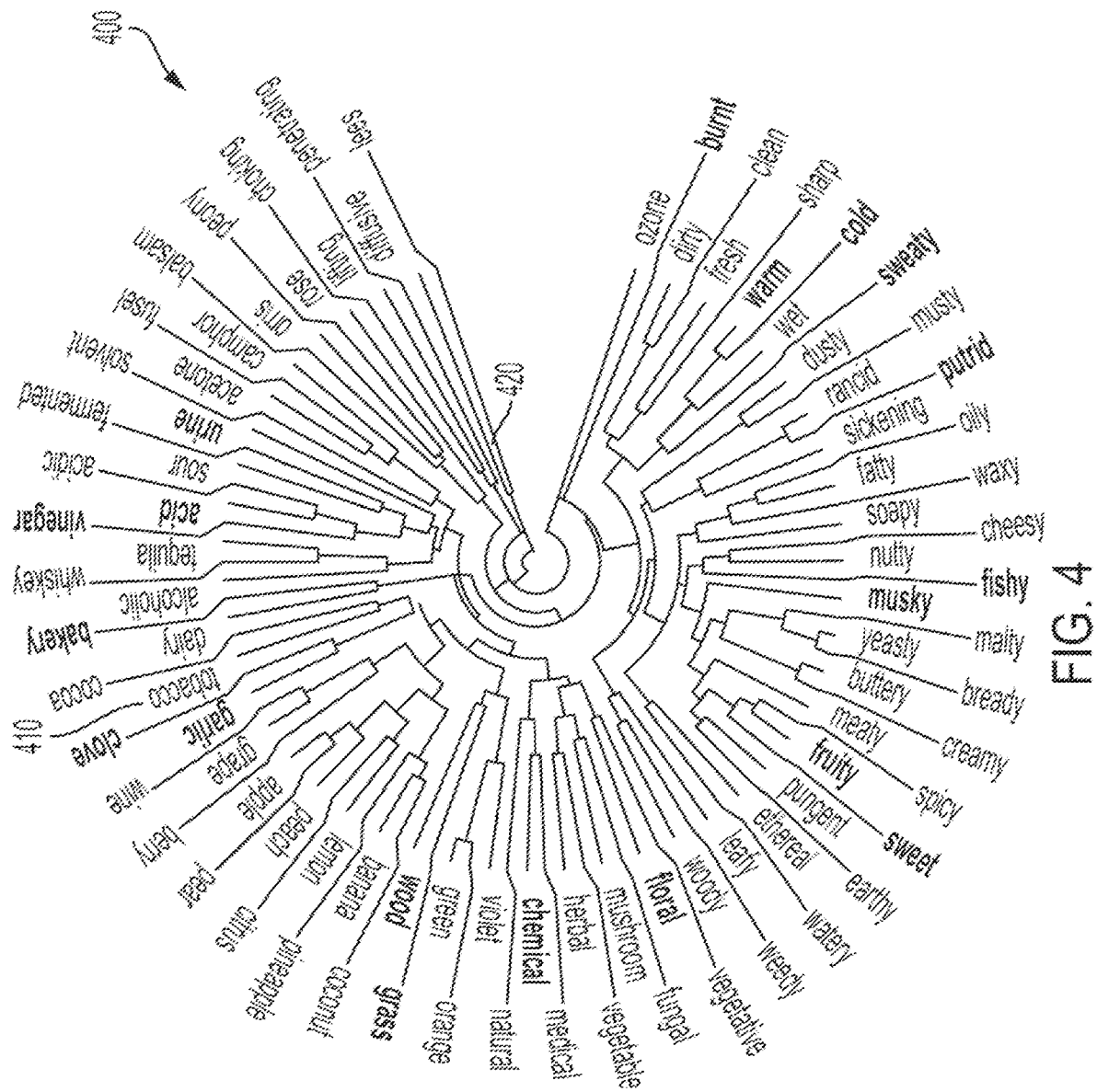
FIG. 4 depicts a hierarchical dendrogram of semantic descriptors, specifically an odorwheel constructed using semantic vectors, according to embodiments of the invention.
Figure 7:
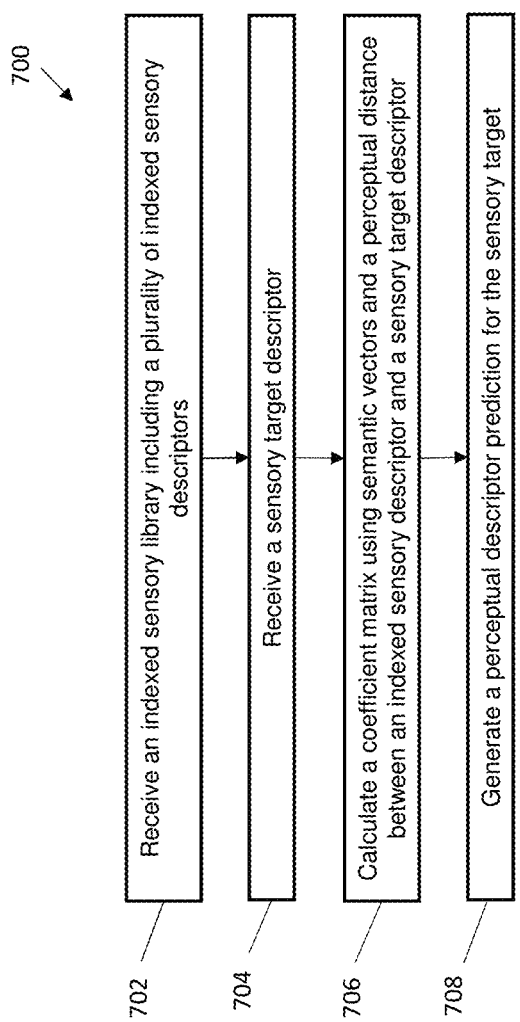
FIG. 7 depicts a flow diagram illustrating a method according to one or more embodiments of the invention.
Figure 8:
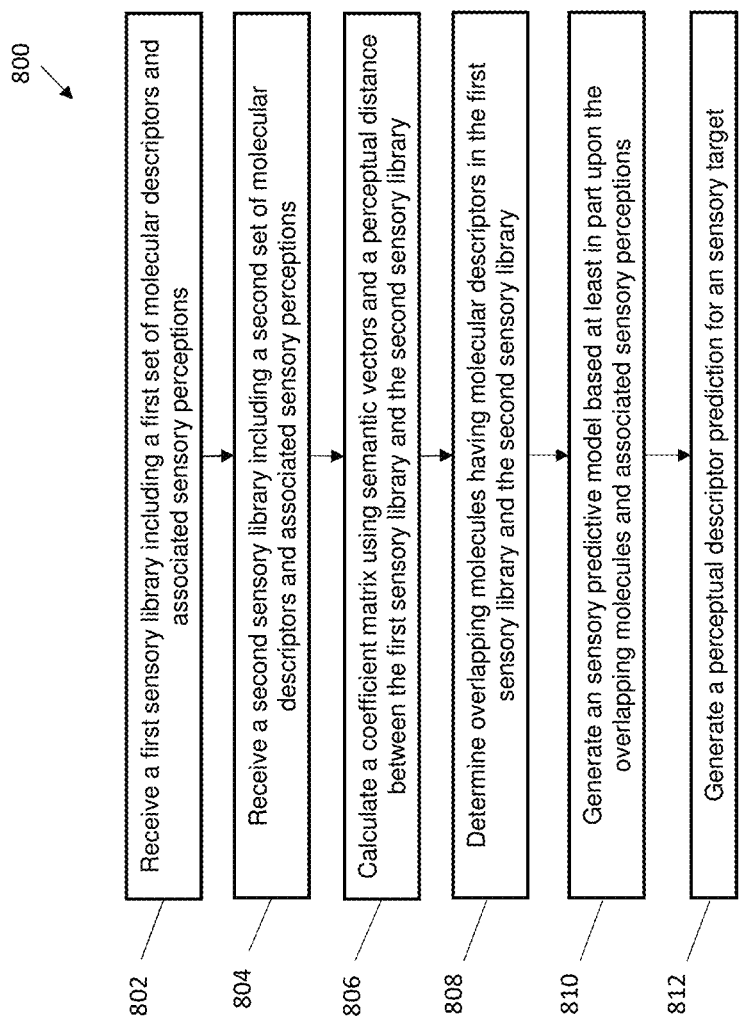
FIG. 8 depicts a flow diagram illustrating a method according to one or more embodiments of the invention.

Turning now to a more detailed description of aspects of the present invention, initially a graphics representation of the methodology is provided, with more detail provided in flow charts in FIGS. 7 and 8. FIG. 4 depicts a hierarchical dendrogram, specifically an odorwheel of semantic descriptors, according to embodiments of the invention. To generate the dendrogram 400, which is an odorwheel in this example, initially a perceptual descriptors list 410 is compiled. For example, for odor words can range from ozone, to chemical, to diffusive. Hundreds of words can be compiled. The perceptual descriptors list 410 is then placed in the dendrogram 400. The words in the perceptual descriptors list 410 are placed in the dendrogram 400 based on their semantic similarity in this case defined as the cosine distance between semantic vectors, i.e., words that are similar are placed next to each other based on having a lower cosine distance. For example, in the dendrogram 400 "rancid" and "putrid" are placed next to each other. Vectors 420 are drawn to illustrate how close each word is to each other word. So, for example, while "rancid" and "putrid" can be immediately connected, "sickening" is one further step away from them.

Figure 5:
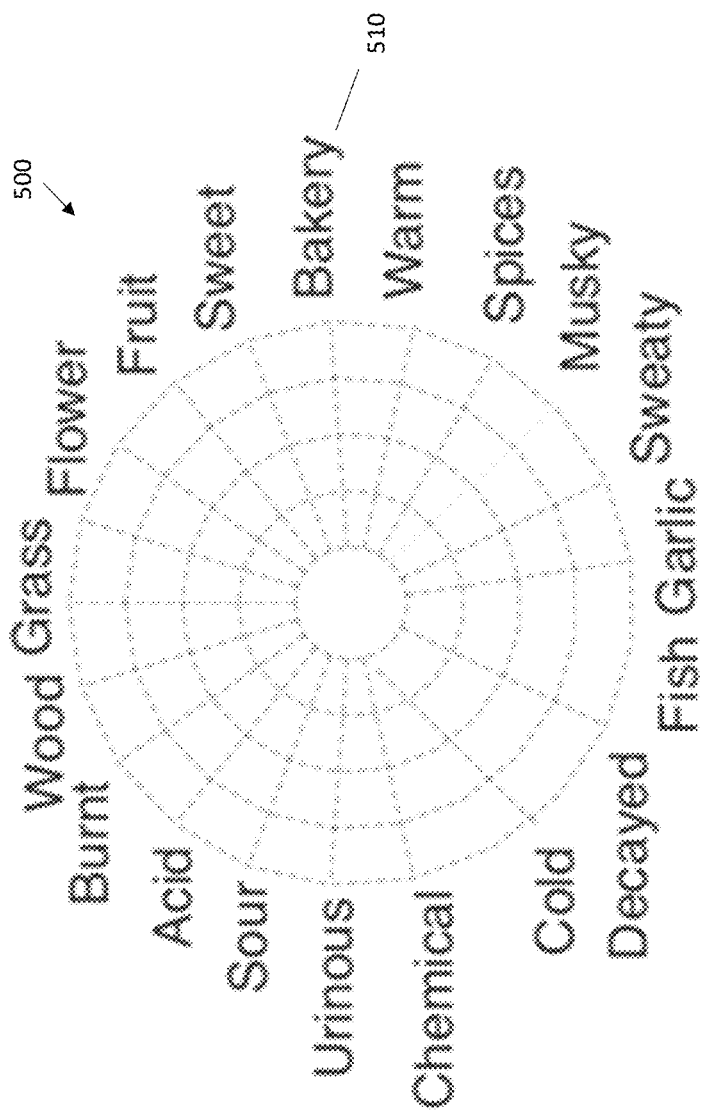
FIG. 5 depicts a reduced set of semantic descriptors, specifically an odorwheel, according to embodiments of the invention.

FIG. 5 depicts a reduced set of perceptual descriptors placed according to a dendrogram as defined in [0060], specifically an odorwheel, according to embodiments of the invention. In order to generate the reduced dendrogram 500, general descriptors are extracted from the hierarchical dendrogram 400 to generate a reduced set of perceptual descriptors 510. The extraction is based on thresholding the hierarchical dendrogram 400 to extract the higher level perceptual descriptors and leave the lower level perceptual descriptors, where level is based on the vector 420 position of the words in the hierarchical dendrogram 400.

Figure 6:
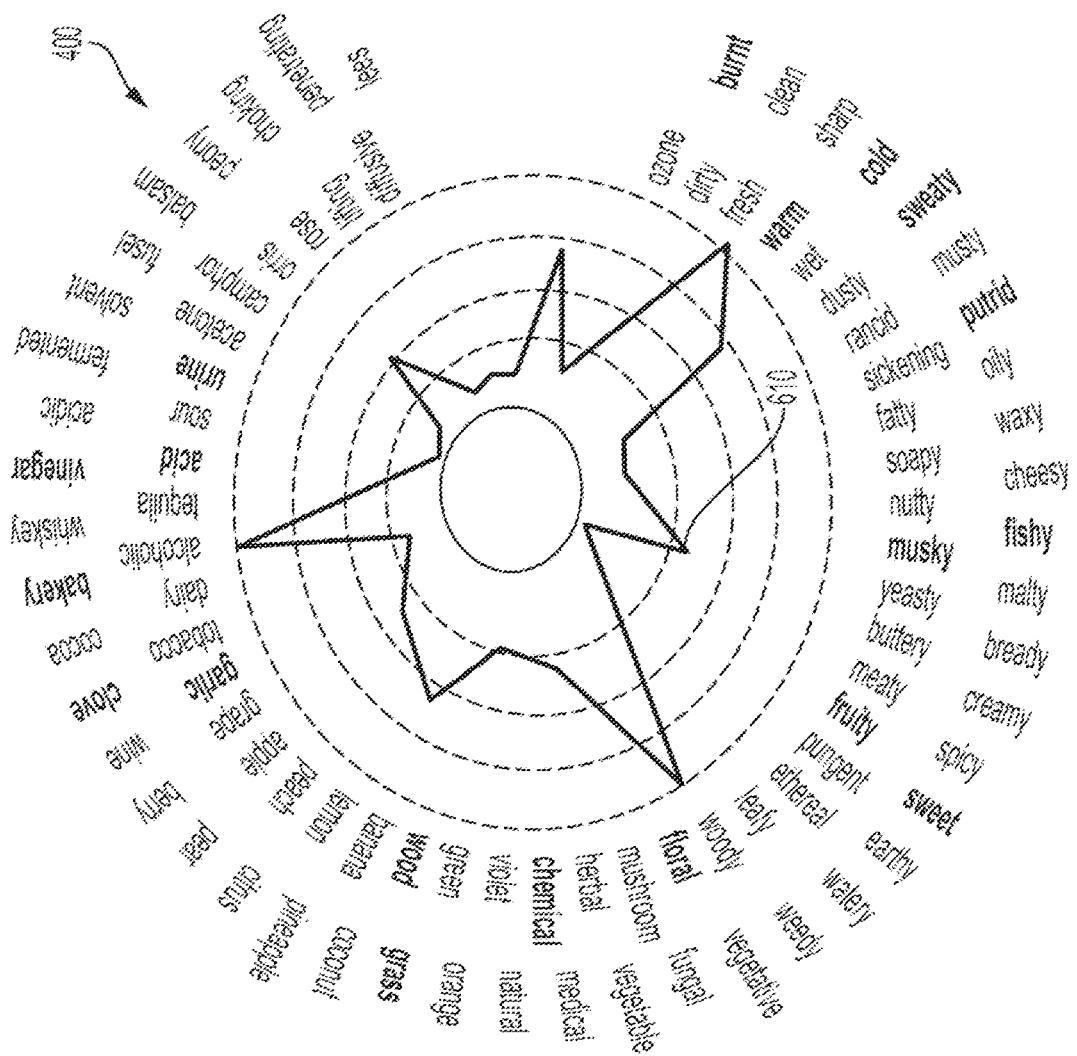
FIG. 6 depicts two sets of rating values for the two sets set of semantic descriptors to illustrate the transformation of ratings from a reduced set of general semantic descriptors to a larger more specific set of semantic descriptors according to embodiments of the invention.
Figure 6:
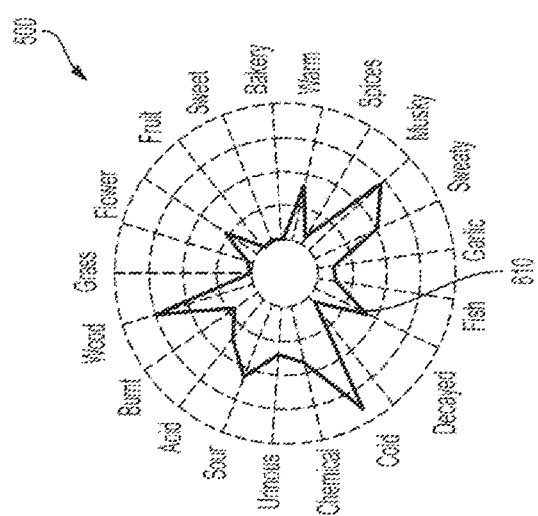

FIG. 6 depicts two sets of semantic descriptors perceptual rating values distributed following their respective dendrogram to illustrate the transformation of rating from a reduced set of general terms to a larger more specific set of terms according to embodiments of the invention. First, ratings are obtained for the reduced set of perceptual descriptors 510 from subject testing. The ratings are graphed onto the reduced set of descriptors 500 in the form of semantic vectors 610. The semantic descriptors 610 are then placed following the hierarchical dendrogram 400 to illustrate and select the expended perceptual ratings using the distance defined by the semantic vectors. For example, "medicinal" can be expanded to "chemical" and "herbal."

FIG. 7 depicts a flow diagram of an exemplary method 700 according to embodiments of the invention. The method 700 includes receiving, using processor 305, an indexed sensory library including a plurality of indexed sensory descriptors (Stage 702).

Sensory perceptions include quantitative and qualitative olfaction, taste, touch, hearing, and vision perceptions, although only a single one of these sensory inputs can be used in a given application of the method. Sensory descriptors can include different types of descriptors, such as numerical, verbal, or visual descriptors of sensory perceptions. In some embodiments of the invention, types of sensory descriptors may be combined. In some embodiments of the invention, sensory descriptors include only semantic descriptors. In some embodiments of the invention, sensory descriptors include semantic descriptors and other types of descriptors.

Semantic descriptors can include any linguistic, visual, and auditory characterizations of the taste or smell of a substance or object. Semantic descriptors can include, for example, words, sentences, paragraphs, books, treatises, facial expressions, drawings, or music that describe a sense. Semantic descriptors can be general, such as "pleasant" "spicy," or object-specific, such as "garlic." Semantic descriptors can be included in semantic vectors, which are vectorial representations of word meaning motivated by the distributional hypothesis. Semantic vectors can be generated by known methods, such as the Word2Vec or fastText continuous-bag-of-words algorithm.

In some embodiments of the invention, perceptual descriptors include a source set of perceptual descriptors, which includes one or more sets of perceptual descriptors associated with a plurality of chemicals or objects. In some embodiments of the invention, the rating scores of the source set of perceptual descriptors can be derived from a known model trained to infer the ratings scores of a chemical based upon a limited source set of perceptual descriptors and semantic vectors. For a number of source set of perceptual descriptors $D_S$ the source-set ratings scores for each chemical i can be collected into a perceptual vectors $p_{S,i}$ of length $V_S$. For each semantic descriptor d in the source set, a semantic vector $s_{S,d}$ can be computed.

In some embodiments of the invention, the source set of perceptual descriptors can be derived by processor 305 from direct measurement. For example, perceptual vectors $p_{S,i}$ can be generated from data obtained by direct measurement, such as by obtaining perceptual data, such as ratings or semantic descriptions, from human subjects.

Molecular descriptors can include chemical information, such as chemical formulas, structures, substructures, and physical properties. Molecular descriptors can be included in chemoinformatic feature vectors that summarize the chemical and/or molecular properties of a substance.

Molecular descriptors can include 0D-descriptors, 1D-descriptors, 2D-descriptors, 3D-descriptors, and 4-D descriptors. 0D-descriptors can include, for example, constitutional descriptors that describe the arrangement of elements within a molecule, the types of chemical bonds present in the molecule, etc. 0D-descriptors can further include count descriptors that indicate, for example, the number of atoms of each element present in a molecular compound. 1D-descriptors can include, for example, lists of structural fragments, fingerprints, or the like. 2D-descriptors can include, for example, graph invariants or the like. 3D-descriptors can include, for example, 3D-Molecule Representation of Structure based on Electron Diffraction (MoRSE) descriptors; Weighted Holistic Invariant Molecular (WHIM) descriptors; Geometry, Topology, and Atom Weights Assembly (GETAWAY) descriptors; quantum-chemical descriptors; size, steric, surface, and volume descriptors; and the like. 4D-descriptors can include, for example, Grid-Independent descriptors (GRIND) or descriptors obtained through Comparative Molecular Field Analysis (CoMFA) methods. The set of molecular descriptors that is used can include any combination of the above-described types of molecular descriptors. Further, in certain example embodiments, a descriptor must satisfy various criteria in order to be used. For example, a molecular descriptor can need to be invariant to molecular numbering or labeling.

Indexed sensory descriptors include sensory descriptors associated with a substance, object, or with other sensory descriptors. Sensory target descriptors include a descriptor of a substance or object that is sought to be described further or in a different manner.

The method 700 includes receiving, using processor 305, an olfactory target descriptor (Stage 704). As used herein, a "sensory target" is understood to mean an object, substance, or descriptor for which a perceptual sensory description is desired. A sensory target descriptor can include, for example, new substances or objects that have no predetermined perceptual descriptor, substances or objects that have a perceptual descriptor but for which a new or additional set of perceptual descriptors are sought, and/or a perceptual descriptors, such as description of a sense, for which a set of related descriptions are desired.

The method 700 includes calculating, using processor 305, a coefficient matrix using semantic vectors and a perceptual distance between an indexed sensory descriptor and an olfactory target descriptor (Stage 706). The method 700 also includes generating, using processor 305, a perceptual descriptor prediction for the sensory target (Stage 708).

A coefficient matrix and perceptual distances can be calculated by known techniques. For example, a coefficient matrix for computing vector distances, including for instance regression models such as LASSO and elastic net regression. LASSO and elastic net, for example, can impose a regularization penalty on regression weights to reduce model complexity and avoid overfitting.

For example, for each descriptor d in a source set, semantic vector $s_{S,d}$ is generated as a 300-dimensional vector generated by a regression technique. These can be collected into a source semantic matrix $S_S$ of dimension $D_S \times 300$ where $D_S$ is the number of perceptual descriptors (such as source-set rating scores). To determine ratings scores for any set of perceptual descriptors, such as perceptual descriptors for a sensory target, it is assumed that semantic descriptors corresponding to each perceptual descriptor d can be computed, and these are collected into a target semantic matrix ST of dimension DT×300, wherein DT is the number of target perceptual descriptors, including semantic descriptors for the sensory target. Rating scores for each target molecule or substance i, for example, can then be estimated through a model. In some embodiments of the invention, the model is a semantics-only model.

A semantics model leverages the structure of the semantic space to predict ratings in the perceptual ratings space. For instance, it can be supposed there exists a coefficient matrix or function $\Gamma$ of dimension $D_S \times D_T$ that roughly maps from the source set of perceptual descriptors to the target set of perceptual descriptors using the semantic vectors for the source perceptual descriptors and the semantic vectors for the target perceptual descriptors, such that $$S_T \approx \Gamma S_S.$$

A semantics-only model assumes that $\Gamma$ maps from the perceptual ratings for the source set of descriptors to the perceptual ratings for the target set for each molecule or substance i:

$$p_{T,i} \approx \Gamma p_{S,i}.$$

Elastic net regression can be used, for example, to estimate $\Gamma$. Such model, for example, does not require a rating score for the source set. Where target descriptor training molecules are available, an estimate for molecule or substance i can be:

$$p_{T,i} \approx \Gamma p_{S,i} + \bar{p}_T.$$

In some embodiments of the invention, the model is a combined semantics and ratings model. In such embodiments of the invention, the predictions of semantics-only models can be averaged with predictions of ratings-only models. Ratings-only models can be generated, for example by assuming a function $\Lambda$ that maps from ratings scores on source descriptors to rating scores on target descriptors for a training set of molecules or substances. Mean ratings can be included, for example, and a final estimate can be $$p_{T,i} \approx \Lambda p_{S,i} + \bar{p}_T.$$

FIG. 8 depicts a flow diagram of another exemplary method 800 according to embodiments of the invention. The method 800 includes receiving, using processor 305, a first sensory library including a first set of molecular descriptors and associated sensory perceptions (Stage 802). For instance, the first sensory library can include a low complexity library including a small set, such as 20 or 21, of perceptual semantic descriptors indexed to a number of molecules.

The method 800 includes receiving, using processor 305, a second sensory library including a second set of molecular descriptors and associated sensory perceptions (Stage 804). For example, second sensory library can include a dataset can be received from individuals that sensed a small library of molecules including a complex description of the individuals' sensory perception using a set of refined words, sentences, drawings, facial expressions, numerical ratings or rankings, and the like. A second sensory library can include an identification of molecules or substances, such as molecules that overlap with the first sensory library.

The first and second sensory libraries can have perceptual descriptors with the same or different complexities. For instance, a first sensory library can have low complexity descriptors, for instance descriptors consisting of single words or short phrases, and the second sensory can have high complexity descriptors, including a set of refined words, sentences or longer language expressions, drawings, or facial expressions. The first and second sensory libraries can have the same or different sized data sets.

The first sensory library, in some embodiments of the invention, is a known library including a set of molecular descriptors and associated sensory perceptions, such as, for olfactory sensing, the Dravnieks dataset including 126 molecules represented by molecular descriptors and 146 words as associated olfactory perceptions (citrus, lemon, grapefruit, orange, fruity, other than citrus, stale, coffee, tobacco, smoke, . . . ), and/or the DREAM dataset of 470 molecules represented by molecular descriptors and 21 words as associated olfactory perceptions.

In some embodiments of the invention, relations between associated sensory perceptions are generated using natural language processing. In some embodiments of the invention, associated sensory perceptions include refined semantic descriptors. Refined semantic descriptors is understood to mean descriptors that have a higher level of complexity than a limited set of single word descriptors in an sensory library, wherein the number of single word descriptors in some embodiments of the invention in the sensory library is less than 100, or less than 50.

The method 800 includes calculating, using processor 305, a coefficient matrix and a perceptual distance between the first sensory library and the second sensory library (Stage 806). The method 800 includes determining, using processor 305, overlapping molecules having molecular descriptors in the first sensory library and the second sensory library (Stage 808). For example, an overlapping molecule can be described by a molecular descriptor, such as "methane," in the first and second sensory libraries. In some embodiments of the invention, the first and second sensory libraries share overlapping molecular descriptors, such as at least 20% overlap or at least 25% overlap of molecular descriptors based upon the total number of molecular descriptors in the libraries. The overlapping molecular descriptors can have the same or different associated olfactory perceptions in the first and second sensory libraries. For example, "$NH_4$" can have an associated sensory perception of "ammonia" in the first sensory library and "strong pungent urine-like smell that induces eyes to water and sometimes makes it difficult to breathe" perception in the second sensory library.

The method 800 includes generating, using processor 305, a sensory predictive model based at least in part upon the overlapping molecules and associated sensory perceptions (Stage 810). In some embodiments of the invention, the predictive model is based at least in part upon natural language processing. The method 800 includes generating a perceptual descriptor prediction for a sensory target (Stage 812). The perceptual descriptor prediction can include a set of refined descriptors for one or more sensory targets.

Molecular descriptors include common or scientific names, chemical formula, or other representative descriptions of a molecule or substance. As used herein, unless otherwise stated, molecular descriptors are not limited to units of one molecule and can include chemical sub-structures, chemical compositions including a plurality of molecules, and/or substances or objects including such molecules and compositions.

Example embodiments of the invention provide various technical features, technical effects, and/or improvements to technology. For instance, example embodiments of the invention provide the technical effect of predicting olfactory perception for a single individual or across a group of individuals based open ended semantic descriptors. This technical effect is achieved by at least in part by the technical feature of calculating a coefficient matrix and distances between semantic vectors of perceptual semantic descriptors. Example embodiments of the invention also provide the technical effect of transforming an olfactory or taste perception from one space of perceptual descriptors to a more complex one. Example embodiments of the invention also provide the technical effect of generating a substance or object having desired olfactory properties. This technical effect is achieved at least in part by the technical feature of predicting a perceptual descriptor set for a target substance or object. The above-described technical effects constitute an improvement to the functioning of a computer configured to predict olfactory perception of chemical compounds and mixtures. In addition, the above-described technical effects constitute an improvement to any of a variety of technological fields including any of those previously described such as, for example, appetite management, odor cancellation, or the like. It should be appreciated that the above examples of technical features, technical effects, improvements to the functioning of a computer, and improvements to technological fields provided by example embodiments of the invention are merely illustrative and not exhaustive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for predicting sensory perception, the method comprising:
    generating a hierarchical dendrogram comprising a plurality of perceptual descriptors composed from a perceptual descriptor list of a library, wherein the plurality of perceptual descriptors are placed within two or more levels of the hierarchical dendrogram by semantic similarity;
    generating a reduced set of perceptual descriptors comprising two or more higher level perceptual descriptors selected from the hierarchical dendrogram at a level higher than based on a defined threshold level, wherein each respective higher level selected perceptual descriptor is selected based on a vector position of the respective higher level selected perceptual descriptor in the hierarchical dendrogram;
    generating a reduced den drogram comprising the reduced set of perceptual descriptors;
    obtaining one or more ratings for each respective higher level selected perceptual descriptor in the reduced dendrogram from one or more inputs;
    graphing the one or more ratings as N-dimensional semantic vectors on the reduced dendrogram, wherein N is at least 300;
    selecting a plurality of indexed sensory descriptors from the hierarchical dendrogram for the reduced dendrogram based on a distance defined by the semantic vectors;
    receiving, by the processor, a sensory target descriptor;
    generating a source semantic matrix based at least in part upon a plurality of source semantic vectors and generating a tar et semantic matrix based at least in part upon a plurality of target semantic vectors; and
    generating, by the processor, a perceptual descriptor rating prediction for the sensory target descriptor using a combined model comprising a semantics model and a ratings model, the semantics model comprising a coefficient matrix or function that maps from a source set of perceptual descriptors to a target set of perceptual descriptors using the plurality of source semantic vectors and the plurality of target semantic vectors, the ratings model comprising a function that maps from ratings scores on source descriptors to rating scores on tar et descriptors for a training set of molecules or substances.

2. The computer-implemented method of claim 1, wherein the indexed sensory descriptors comprise semantic descriptors.

3. The computer-implemented method of claim 1, wherein the library comprises chemoinfon atic vectors that define one or more molecular descriptors.

4. The computer-implemented method of claim 1, wherein the library comprises semantic vectors of the plurality of indexed sensory descriptors.

5. The computer-implemented method of claim 1, wherein the library comprises a set of molecular descriptors and associated sensory perceptions.

6. A computer program product for predicting sensory perception, the computer program product comprising:
    a computer readable storage medium readable by a processing circuit and storing program instructions for execution by the processing circuit for performing a method comprising:
        generating a hierarchical dendrogram comprising a plurality of perceptual descriptors composed from a perceptual descriptor list of a library, wherein the plurality of perceptual descriptors are placed within two or more levels of the hierarchical dendrogram by semantic similarity;
        generating a reduced set of perceptual descriptors comprising two or more higher level perceptual descriptors selected from the hierarchical dendrogram at a level higher than based on a defined threshold level, wherein each respective higher level selected perceptual descriptor is selected based on a vector position of the respective higher level selected perceptual descriptor in the hierarchical dendrogram;
        generating a reduced dendrogram comprising the reduced set of perceptual descriptors;
        obtaining one or more ratings for each respective higher level selected perceptual descriptor in the reduced dendrogram from one or more inputs;

graphing the one or more ratings as N-dimensional semantic vectors on the reduced dendrogram, wherein N is at least 300;

selecting plurality of indexed sensory descriptors from the hierarchical dendrogram for the reduced dendrogram based on a distance defined by the semantic vectors;

receiving a sensory target descriptor;

generating a source semantic matrix based at least in part upon a plurality of source semantic vectors and generating a target semantic matrix based at least in part upon a plurality of target semantic vectors: and generating a perceptual descriptor prediction for the sensory target descriptor using a combined model comprising a semantics model and a ratings model, the semantics model comprising a coefficient matrix or function that maps from a source set of perceptual descriptors to a target set of perceptual descriptors using the plurality of source semantic vectors and the plurality of target semantic vectors, the ratings model comprising a function that maps from ratings scores on source descriptors to rating scores on target descriptors for a training set of molecules or substances.

7. The computer program product of claim 6, wherein the indexed sensory descriptors comprise semantic descriptors.

8. The computer program product of claim 6, wherein the library comprises chemoinformatic vectors also named molecular descriptors.

9. The computer program product of claim 6, wherein the library comprises semantic vectors.

10. The computer program product of claim 6, wherein the coefficient matrix is calculated by regression.

11. The computer program product of claim 6, wherein the library comprises a set of molecular descriptors and associated sensory perceptions.

12. A processing system for predicting sensory perception, the processor system comprising:

a processor in communication with one or more types of memory, the processor configured to perform a method comprising:

generating a hierarchical dendrogram comprising a plurality of perceptual descriptors composed from a perceptual descriptor list of a library, wherein the plurality of perceptual descriptors are placed within two or more levels of the hierarchical dendrogram by semantic similarity;

generating a reduced set of perceptual descriptors comprising two or more higher level perceptual descriptors selected from the hierarchical dendrogram at a level higher than based on a defined threshold level, wherein each respective higher level selected perceptual descriptor is selected based on a vector position of the respective higher level selected perceptual descriptor in the hierarchical dendrogram;

generating a reduced dendrogram comprising the reduced set of perceptual descriptors;

obtaining one or more ratings for each respective higher level selected perceptual descriptor in the reduced dendrogram from one or more inputs;

graphing the one or more ratings as N-dimensional semantic vectors on the reduced dendrogram, wherein N is at least 300;

selecting a plurality of indexed sensory descriptors from the hierarchical dendrogram for the reduced dendrogram based on a distance defined by the semantic vectors;

receiving a sensory target descriptor;

generating a source semantic matrix based at least in part upon a plurality of source semantic vectors and generatin. a target semantic matrix based at least in part upon a plurality of target semantic vectors; and generating a perceptual descriptor prediction for the sensory target descriptor using a combined model comprising a semantics model and a ratings model, the semantics model comprising a coefficient matrix or function that maps from a source set of perceptual descriptors to a target set of perceptual descriptors using the plurality of source semantic vectors and the plurality of target semantic vectors, the ratings model comprising a function that maps from ratin. s scores on source descriptors to rating scores on tar,. et descriptors for a training set of molecules or substances.

13. The processing system of claim 12, wherein the indexed sensory descriptors comprise semantic descriptors.

14. The processing system of claim 12, wherein the library comprises chemoinfonnatic vectors also named molecular descriptors.

15. The processing systemof claim 12, herein the library comprises semantic vectors.

16. The processing system of claim 12, wherein the coefficient matrix is calculated by regression.

\* \* \* \* \*